US007398140B2

(12) United States Patent
Kernwein et al.

(10) Patent No.: US 7,398,140 B2
(45) Date of Patent: Jul. 8, 2008

(54) OPERATOR WARNING SYSTEM AND METHOD FOR IMPROVING LOCOMOTIVE OPERATOR VIGILANCE

(75) Inventors: Jeffrey D. Kernwein, Cedar Rapids, IA (US); Frank Wilson, Cedar Rapids, IA (US); Kevin J. Angel, Marion, IA (US); Scott A. Sollars, Marion, IA (US)

(73) Assignee: Wabtec Holding Corporation, Wilmerding, PA (US)

( * ) Notice: Subject to any disclaimer, the term of this patent is extended or adjusted under 35 U.S.C. 154(b) by 487 days.

(21) Appl. No.: 10/946,396

(22) Filed: Sep. 21, 2004

(65) Prior Publication Data

US 2005/0110628 A1 May 26, 2005

Related U.S. Application Data

(63) Continuation-in-part of application No. 10/437,514, filed on May 14, 2003, now abandoned.

(51) Int. Cl.
*G05D 1/00* (2006.01)

(52) U.S. Cl. ............................ 701/19; 701/20; 701/36; 340/425.5; 340/438; 340/457; 246/115; 246/124; 246/208; 246/473 R

(58) Field of Classification Search .................. 701/19, 701/20, 23, 200, 213, 207, 208, 36, 300; 246/1 R, 1 C, 124, 115, 208, 473 R; 340/425.5, 340/435, 438, 457

See application file for complete search history.

(56) References Cited

U.S. PATENT DOCUMENTS 4,181,943 A 1/1980 Mercer, Sr. et al.
4,459,668 A 7/1984 Inoue et al.
4,561,057 A 12/1985 Haley, Jr. et al.
4,711,418 A 12/1987 Aver, Jr. et al.
5,072,900 A 12/1991 Malon
5,129,605 A 7/1992 Burns et al.
5,177,685 A 1/1993 Davis et al.
5,332,180 A 7/1994 Peterson et al.
5,340,062 A 8/1994 Heggestad
5,364,047 A 11/1994 Petit et al.
5,394,333 A 2/1995 Kao
5,398,894 A 3/1995 Pascoe
5,452,870 A 9/1995 Heggestad (Continued)

FOREIGN PATENT DOCUMENTS

WO WO 89/05255 6/1989

(Continued)

*Primary Examiner*—Gertrude Arthur-Jeanglaude
(74) *Attorney, Agent, or Firm*—The Webb Law Firm

(57) ABSTRACT

Provided is an operator warning system for use in connection with a locomotive having a horn system with a horn activation actuator and a horn device for producing a noise. The operator warning system includes an onboard computer system with a database having grade crossing data and locomotive data thereon. The onboard computer system is in communication with the horn system. The operator warning system also includes a warning device for providing an audio, visual and/or tactile indicator to an operator of the locomotive based upon the grade crossing data, locomotive data and/or actuation condition of the horn activation actuator. A method for improving locomotive operator vigilance is also provided.

37 Claims, 3 Drawing Sheets

U.S. PATENT DOCUMENTS

| | | | |
|---|---|---|---|
| 5,533,695 | A | 7/1996 | Heggestad et al. |
| 5,541,981 | A | 7/1996 | Lynn |
| 5,699,986 | A | 12/1997 | Welk |
| 5,740,547 | A | 4/1998 | Kull et al. |
| 5,751,569 | A | 5/1998 | Metel et al. |
| 5,754,094 | A | 5/1998 | Frushour |
| 5,803,411 | A | 9/1998 | Ackerman et al. |
| 5,828,979 | A | 10/1998 | Polivka et al. |
| 5,836,529 | A | 11/1998 | Gibbs |
| 5,855,004 | A | 12/1998 | Novosel et al. |
| 5,867,122 | A | 2/1999 | Zahm et al. |
| 5,944,768 | A | 8/1999 | Ito et al. |
| 5,950,966 | A | 9/1999 | Hungate et al. |
| 5,978,718 | A | 11/1999 | Kull |
| 6,049,745 | A | 4/2000 | Douglas et al. |
| 6,081,769 | A | 6/2000 | Curtis |
| 6,102,340 | A | 8/2000 | Peek et al. |
| 6,112,142 | A | 8/2000 | Shockley et al. |
| 6,135,396 | A | 10/2000 | Whitfield et al. |
| 6,179,252 | B1 | 1/2001 | Roop et al. |
| 6,218,961 | B1 | 4/2001 | Gross et al. |
| 6,311,109 | B1 | 10/2001 | Hawthorne et al. |
| 6,322,025 | B1 | 11/2001 | Colbert et al. |
| 6,323,785 | B1 | 11/2001 | Nickell et al. |
| 6,345,233 | B1 | 2/2002 | Erick |
| 6,371,416 | B1 | 4/2002 | Hawthorne |
| 6,373,403 | B1 | 4/2002 | Korver et al. |
| 6,374,184 | B1 | 4/2002 | Zahm et al. |
| 6,377,877 | B1 | 4/2002 | Doner |
| 6,416,021 | B2 | 7/2002 | Greene, Jr. |
| 6,421,587 | B2 | 7/2002 | Diana et al. |
| 6,456,937 | B1 | 9/2002 | Doner et al. |
| 6,457,682 | B2 | 10/2002 | Anderson et al. |
| 6,459,964 | B1 | 10/2002 | Vu et al. |
| 6,459,965 | B1 | 10/2002 | Polivka et al. |
| 6,487,478 | B1 | 11/2002 | Azzaro et al. |
| 6,494,408 | B2 | 12/2002 | Katzer |
| 6,519,512 | B1 | 2/2003 | Haas et al. |
| 6,609,049 | B1 | 8/2003 | Kane et al. |
| 2001/0032908 | A1* | 10/2001 | Anderson et al. ........... 246/124 |
| 2004/0015275 | A1 | 1/2004 | Herzog et al. |
| 2004/0015276 | A1 | 1/2004 | Kane et al. |

FOREIGN PATENT DOCUMENTS

| | | |
|---|---|---|
| WO | WO 2004/002801 | 1/2004 |

* cited by examiner

OPERATOR WARNING SYSTEM AND METHOD FOR IMPROVING LOCOMOTIVE OPERATOR VIGILANCE

CROSS REFERENCE TO RELATED APPLICATIONS

This application is a continuation-in-part of U.S. patent application Ser. No. 10/437,514, filed May 14, 2003, now abandoned, which is herein incorporated by reference in its entirety.

BACKGROUND OF THE INVENTION

1. Field of the Invention

The present invention relates generally to locomotive horn systems and other similar warning systems that ensure safety as a locomotive traverses a track and, in particular, to an operator warning system and method that improves the vigilance of the locomotive operator at various portions and positions on the track, such as at grade crossings and the like.

2. Description of Related Art

In order to operate a locomotive or train, an operator must interact with a train control system. These train control systems, in turn, bear directly on a locomotive operator's ability to control the locomotive horn. Further, the locomotive operator, typically referred to as an engineer, is required to sound the horn at an intersection of a road in the railroad track, and such intersections are known as grade crossings.

A locomotive operator is required to manage his or her train within the operating limits of the railroad, and must also strive to control the train, such that stresses within the train consist are limited, and the train effectively arrives at the destination within a scheduled timeframe. Accordingly, the responsibility of managing a train, coupled with the distractions within the locomotive cab, can lead to decreased vigilance in the repetitive task of sounding the locomotive horn at grade crossings. To add to this problem, an operator must also be aware of the crossings that do not require horn activation, and crossings that require horn activation only within certain hours of the day or direction of approach to the grade crossing.

According to the prior art, certain systems have been developed to increase crew vigilance with the introduction of crew alerter devices in the locomotive cab. These devices monitor operator actions, such as changes in brake settings, throttle settings or manual horn activation. In the event that no operator activity is detected within a particular interval of time, the alerter device attempts to gain the attention of the crew through a visual or audible indication. Further, if after a longer interval of time passes and no action has been taken by the crew, or if the system cannot determine whether the train is still in the control of the operator, the alerter device may time out and automatically apply the locomotive brakes.

Computer-based train control systems have taken crew vigilance to an even greater level by providing an onboard computer system that monitors train speeds, limits of authority and other restrictions and enforces these parameters. The integration of a track database with an onboard navigation system provides for the ability to warn an operator of potential speed or authority violations, thereby increasing vigilance. However, neither the crew alerter systems nor current train control systems provide vigilance for the express purpose of reminding the operator to sound the locomotive horn at a grade crossing. Therefore, there remains a need in the art to provide such a system.

Further prior art systems include methods that automatically sequence the locomotive horn according to regulations at required grade crossings. See, e.g., U.S. Pat. No. 6,609,049 to Kane et al. In particular, the system of this patent discusses the incorporation of an onboard database that includes grade crossings, a navigation system, a predictor that determines when to sound the horn according to the regulations and an interface to the locomotive horn. Although this system minimizes the potential for missed horn activations, it does not allow the operator to intervene or preempt the horn activation, as would be required during switching operations around grade crossings or other situations where the operator has greater situational awareness than the onboard computer. Therefore, there remains a need for a system that improves locomotive operator vigilance around grade crossings, but still provides the operational flexibility for an operator to perform his or her duty with respect to activation of the horn.

SUMMARY OF THE INVENTION

It is, therefore, an object of the present invention to provide an operator warning system and method for improving locomotive operator vigilance that overcomes the deficiencies of the prior art. It is another object of the present invention to provide an operator warning system and method for improving locomotive operator vigilance that provides alarms or indicators for the express purpose of reminding the operator to sound the locomotive horn at various positions on the track, such as at grade crossings. It is a still further object of the present invention to provide an operator warning system and method for improving locomotive operator vigilance that improves the operator's vigilance around grade crossings. It is another object of the present invention to provide an operator warning system and method for improving locomotive operator vigilance that improves the operator's vigilance around pedestrian crossings of the railroad right-of-way. It is yet another object of the present invention to provide an operator warning system and method for improving locomotive operator vigilance that provides for the flexibility for an operator to perform his or her duty with respect to the activation of the horn, but still provide a locomotive horn overlay system for safety purposes.

Accordingly, the present invention is directed to an operator warning system for use in connection with a locomotive. The locomotive includes a horn system with a horn activation actuator and a horn device that produces a noise. The operator warning system includes an onboard computer system, which has a database thereon including grade crossing data and locomotive data. The onboard computer system is in communication with the horn system. The operator warning system also includes a warning device that provides an audio, visual and/or tactile indicator to an operator of the locomotive based upon grade crossing data, locomotive data and/or actuation condition of the horn activation actuator.

The present invention is also directed to a method of improving locomotive operator vigilance for use in connection with a locomotive described above. This method includes the steps of: determining grade crossing data including grade crossing location, grade crossing identity, grade crossing regulation and/or grade crossing conditions; determining horn activation requirement data for the grade crossing; determining locomotive data including locomotive position on a track, locomotive position within the consist, locomotive speed, locomotive direction of travel and/or locomotive operation parameters; and providing an audio, visual and/or tactile indicator to an operator of the locomotive based upon the grade crossing data, locomotive data, horn activation requirement data and/or actuation condition of the horn activation actuator.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
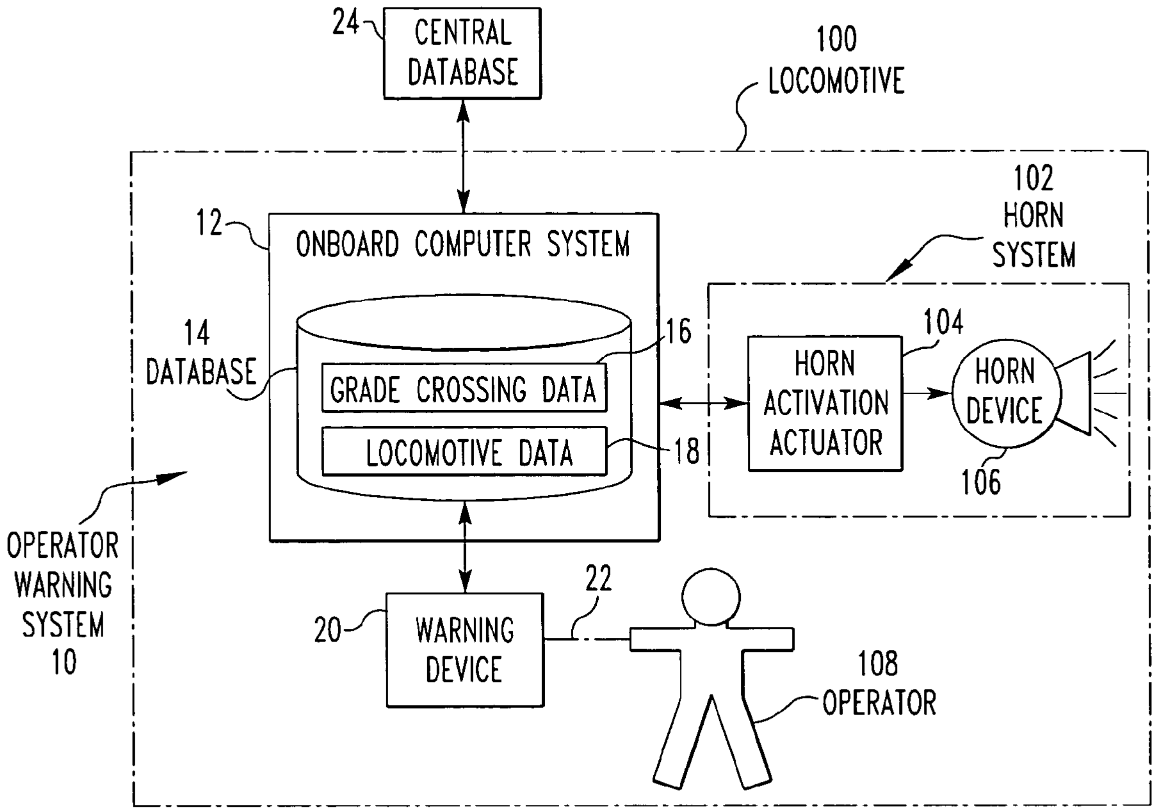
FIG. 1 is a schematic view of an operator warning system in accordance with the present invention.
Figure 2:
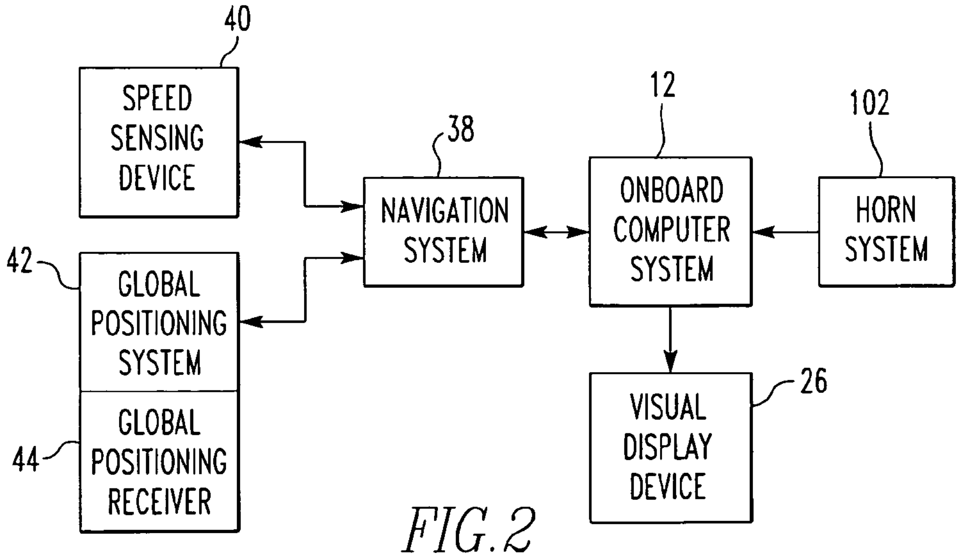
FIG. 2 is a block diagram of a preferred embodiment of an operator warning system according to the present invention.

The present invention is directed to an operator warning system 10 as illustrated in schematic form in various embodiments in FIGS. 1 and 2. The operator warning system 10 is for use in connection with a locomotive 100, which is also referred to as a "train" and a group of locomotives and/or cars is referred to as a "train consist". As is known in the art, the locomotive 100 includes a horn system 102 with a horn activation actuator 104 and a horn device 106. The horn activation actuator 104, typically in the form of a button, is depressible by an operator 108, and the horn activation actuator 104 would send a signal to the horn device 106 to activate the horn device 106 and produce a noise, such as a warning sound. The horn device 106 may be in the form of an electro pneumatic horn valve, as is known in the art.

The operator warning system 10 includes an onboard computer system 12 which includes the necessary processing algorithms and/or software for determining if and when to sound the horn device 106 and provide other information or data to the operator 108. In addition, a database 14 is resident within or stored on the onboard computer system 12, and this database 14 includes grade crossing data 16 and locomotive data 18. The onboard computer system 12 is in communication with the horn system 102 of the locomotive 100. The operator warning system 10 also includes a warning device 20 which provides an audio, visual and/or tactile indicator 22 to the operator 108 of the locomotive 100. Further, this indicator 22 is based upon the grade crossing data 16, the locomotive data 18 or an actuation condition of the horn activation actuator 104, such as whether the actuator 104 is activated, idle, etc. For the purposes of this disclosure, the term "grade crossing" is defined as a point on the railroad right-of-way where either a road or sidewalk crosses the train tracks at the same level or grade as those train tracks. Therefore, both vehicle and pedestrian crossings at grade would be included.

The database receives, stores and transmits data that is particularly useful in connection with the operating warning system 10. Specifically, the grade crossing data 16 may include data reflective of grade crossing location, grade crossing identity, grade crossing regulation, grade crossing condition, grade crossing horn activation requirement data, etc. In addition, the locomotive data 18 may include data reflective of locomotive position, locomotive speed, locomotive position in a train consist, locomotive operation parameter, etc. Also included in the database 14 is information regarding the railroad subdivision upon which the locomotive 100 is operating. In this regard, the onboard computer system 12 may be in communication with a central database 24 which includes track data. For example, the entire worldwide network database may be maintained in this central database 24 in an office server, where pertinent portions are distributed to the locomotives 100 in order to support navigation functions. The track data may include data reflective of grade crossing information, parallel track condition, switch information, etc.

Figure 3:
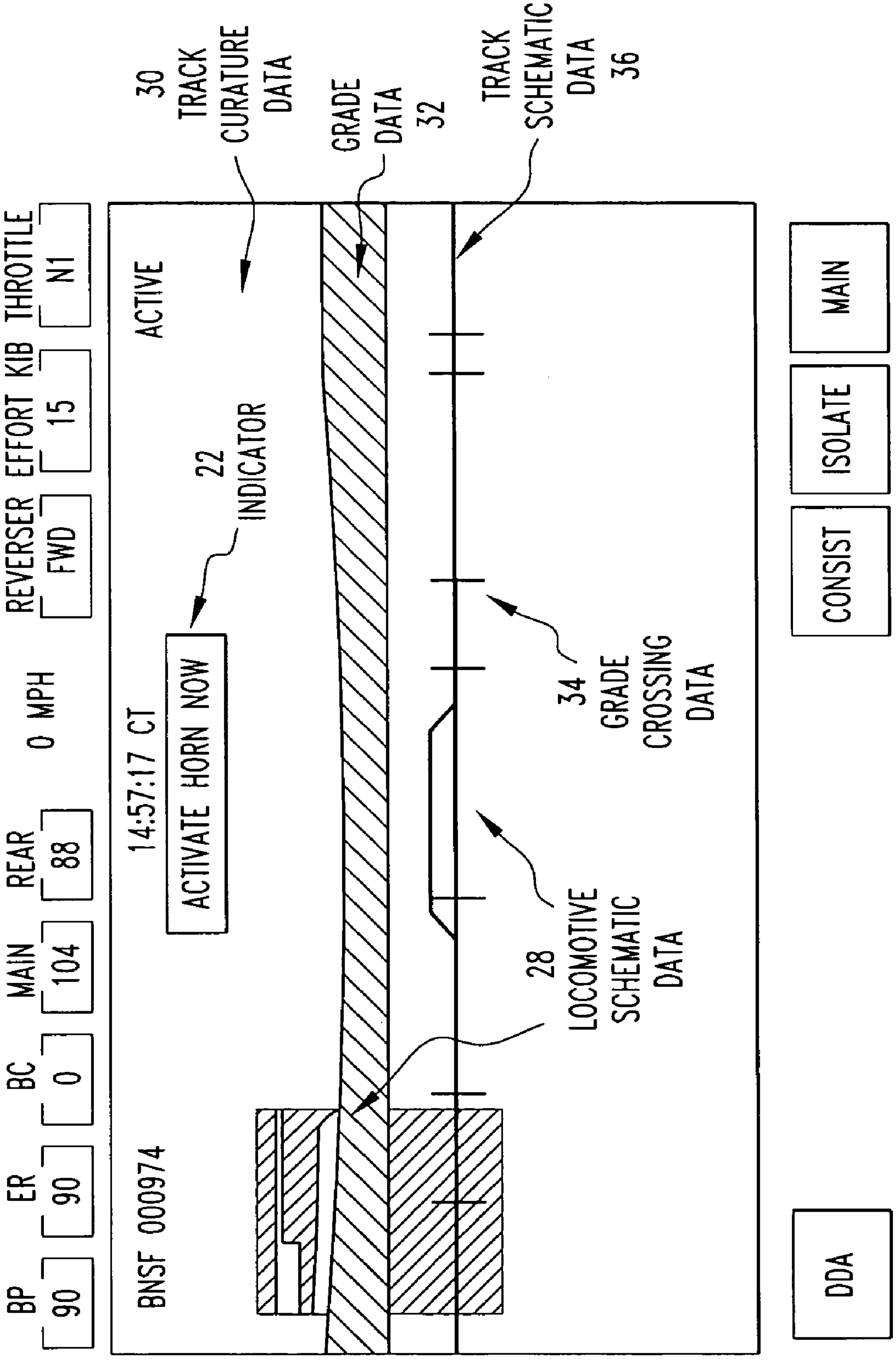
FIG. 3 is a screenshot of an operator warning system according to the present invention in one preferred embodiment.

In one preferred and non-limiting embodiment, the warning device 20 may be in the form of a visual display device 26, such as a computer screen, a monitor or other screen device as is known in the art. The visual display device 26 provides a visual indicator 22 to the operator 108. As seen in FIG. 3, the visual indicator 22 may be in the form of a graphic positioned on a screen, which, for example, informs the operator 108 to "ACTIVATE HORN NOW" or in another example "ACTIVATION OF HORN NOT REQUIRED." In another preferred and non-limiting embodiment, the visual display device 26 may also provide other pertinent data, in a visual form, to the operator 108. For example, the visual display device 26 may provide locomotive schematic data 28, track curvature data 30, grade data 32, grade crossing data 34 and/or track schematic data 36.

In this embodiment, grade crossings are indicated by either a bright blue or pale blue line, which is perpendicular to the track in the track schematic data 36 portion of the screen. Bright blue lines indicate crossings at which the horn device 106 should be activated, whereas pale blue lines indicate the presence of a crossing that does not require horn device 106 activation. Accordingly, the grade crossing data 34 also includes horn activation requirement data indicative of whether the horn device 106 is required to be activated in connection with a specified grade crossing. Therefore, the colored or shaded lines provide a further visual indication to the operator 108 indicating whether the horn device 106 should be activated, or whether the operator 108 does not need to activate the horn device 106. Examples of track portions that may not require horn device 106 activation could be private crossings or public crossings with temporal horn device 106 activation restrictions.

While discussed above in connection with the previous embodiment, where the colored lines are perpendicular to the track, any such indicator of crossings is envisioned, such as varying shapes, colors or shades. Further, based upon local time and the temporal restrictions of a given crossing, the display of that crossing could change from a bright blue to a pale blue line or vice versa. Therefore, the indication is modified when the activation requirement data changes.

In operation, the operator 108 could study the visual display device 26 and locate the position of the locomotive 100 in connection with the next grade crossing. Further, the grade crossing data 34 would include an indication of whether the horn device 106 should be activated at that particular crossing. In the event that the operator 108 has lost vigilance, the indicator 22, such as the text message illustrated in FIG. 3, would be activated to alert the operator 108 to the requirement of activating the horn device 106 for an upcoming crossing.

In another preferred embodiment, the grade crossing data 16 includes horn activation requirement data, and the warning device 20 provides the indicator 22 based upon the horn activation requirement data and the actuator condition of the horn activation actuator 104. In particular, the onboard computer system 12 sends a signal to the horn system 102 and directly to the horn device 106 based upon the horn activation requirement data and the actuation condition of the horn activation actuator 104. Therefore, the onboard computer system 12 can automatically activate the horn device 106 in the event the operator 108 has lost vigilance. However, if the operator 108 regains this vigilance and activates the horn device 106 via the horn activation actuator 104, the onboard computer system 12 would terminate its automatic signal based upon this condition. Further, the onboard computer system 12 would send a signal to the horn system 102 to activate the horn device 106 during at least a portion of the time that the locomotive 100 traverses a particular grade crossing.

Referring now to FIG. 2, the operator warning system 10 may also include a navigation system 38. In a preferred and non-limiting embodiment, the navigation system 38 would include a combination of a global positioning system (GPS) 42 and a speed-sensing device 40. For example, the speed-sensing device 40 may be an axle-mounted speed sensor. The global positioning system 42 would include a global positioning receiver 44 that provides periodic locomotive 100 position data to the database 14 on the onboard computer system 12. Therefore, the global positioning receiver 44 provides for periodic positioning against the onboard track database 14, and after an exact location has been determined in the track database 14, a positioning algorithm relies upon dead reckoning along the track by considering time and velocity as derived from the speed sensing device 40, in this case an axle-mounted speed sensor. Since navigation is along a predetermined linear path, the dead reckoning approach provides for a simple, et accurate means of navigating. After a period of time, however, the uncertainty of the dead reckoning system will have grown to the point where another "fix" of the global positioning system 42 is required to obtain an accurate navigation solution. This approach would allow for periodic outages of the global positioning system 42, such as may be the case while traversing through a tunnel, however, even during these outages, a navigational solution is provided until a limit of uncertainty is reached. It is further envisioned that the navigation system 38 may be in the form of a transponder circuit, an inertial navigation system, a magnetic compass, computer vision, etc.

Figure 4:
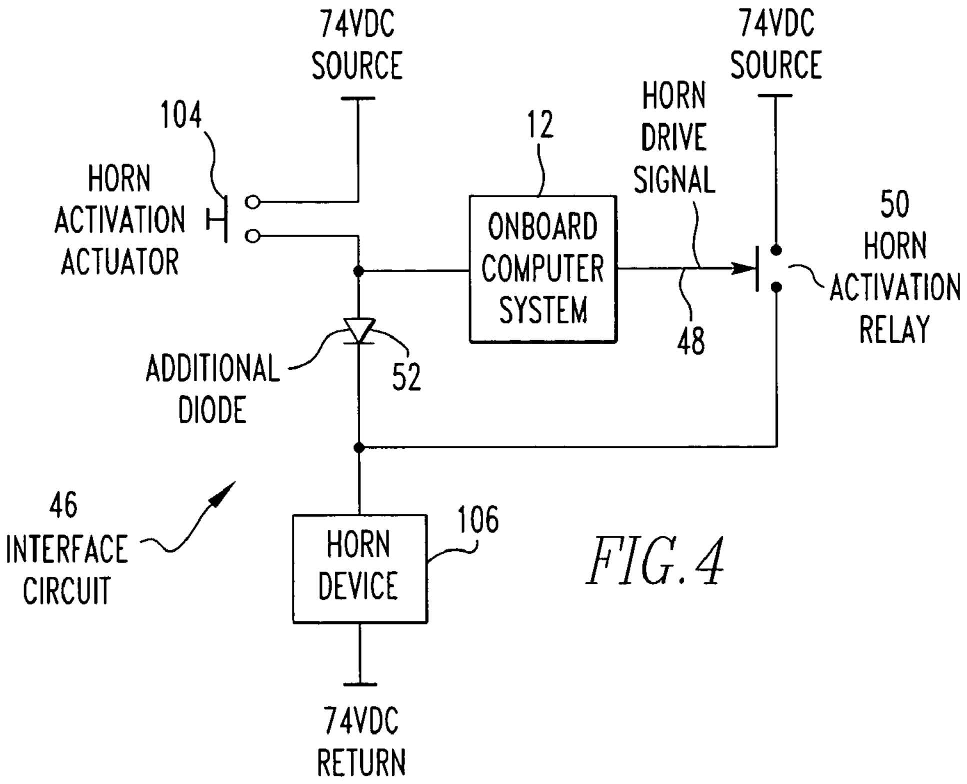
FIG. 4 is a schematic diagram of a locomotive horn circuit for use in connection with an operator warning system according to the present invention.

The operator warning system 10 may also include an interface circuit 46, which is in communication with the horn system 102. The interface circuit 46 can determine whether the horn device 106 has been activated by a signal initiated by the horn activation actuator 104 or the onboard computer system 12. In one preferred and non-limiting embodiment, as illustrated in FIG. 4, the interface circuit 46 is provided to both sense operator 108 activation of the horn device 106 and computer-controlled activation of the horn device 106 if a loss of vigilance is detected. A preferred embodiment is a fully electric horn system where voltage is controlled through the operator horn activation actuator 104 for the purpose of driving an electro pneumatic valve that allows air to expel through the horn device 106. It is envisioned that a pneumatic pressure switch could also be used to detect operator activation of the pneumatically-controlled horn. In the case of the electro pneumatic implementation, and in the case of a loss of operator 108 vigilance, the onboard computer system 12 sends a horn drive signal 48 to close a horn activation relay 50, which activates the horn device 106. This is referred to as the "automatic" activation of the horn device 106. However, as seen in FIG. 4, if the operator 108 presses the horn activation actuator 104, the horn device 106 is activated as well. Therefore, an additional diode 52 is placed in series between the existing operator horn activation actuator 104 and the horn device 106, such as the coil of the electro pneumatic horn valve. This additional diode 52 provides for a means of distinguishing between an operator's activation of the horn device 106 and a computer-controlled activation of the horn device 106. This is useful in that, while the onboard computer system 12 may be driving the activation of the horn device 106, it still has the ability to detect activation of the operator's horn activation actuator 104.

As discussed above, the warning device 20 may be in various forms. For example, the warning device 20 may use a variety of operator interface mechanisms, such as verbal or tone audible warnings, simple visual warnings, such as a warning lamp or simple text display and/or tactile warnings, such as a seat vibrator. In addition, the onboard computer system 12 may have many functions well known in the art. For example, the onboard computer system 12 may use the airbrake and throttle settings to determine if the locomotive 100 is operating in lead or trail, and would then only activate the horn device 106 in the lead position.

Figure 5:
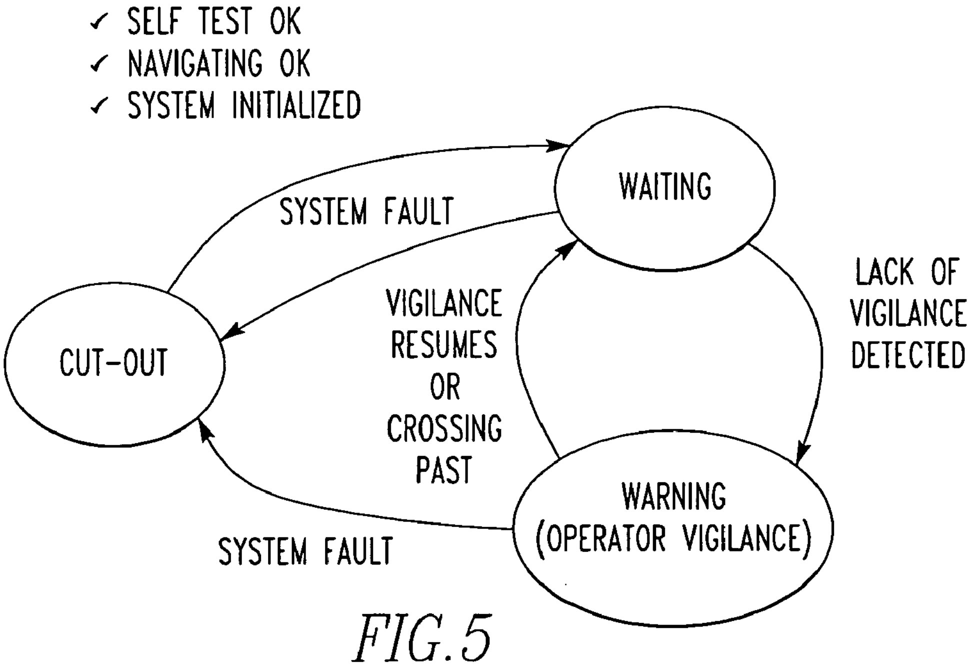
FIG. 5 is a schematic view of a state diagram of an operator warning system according to the present invention indicating operating modes of the system.

Referring now to FIG. 5, and in one preferred and non-limiting embodiment of the operator warning system 10, the onboard computer system 12 operation includes three basic states. The WAITING state and the CUT-OUT state produce no outputs from the system, but the WARNING state engages the engineer vigilance process and operating warning system 10 discussed above. In operation, the system 12 boots up in the CUT-OUT state and remains there until a self test is executed and passed, an explicit system 12 initialization has been commanded by the operator 108, the navigation system 38 has a valid track location and the locomotive 100 is determined to be the lead unit in the train consist. The position of the locomotive 100 may be determined by monitoring the airbrake settings. Further, by detecting that the airbrake system is "cut-in" and also set to "lead", the onboard computer system 12 can conclude that this is the lead locomotive 100 in a train consist. Of course, an exception to this case would be a locomotive 100 operating in either distributive power mode or as a pusher, where the locomotive 100 would not be a lead unit, but the airbrake settings would be both "cut-in" and "lead". Under this exception condition, the system 12 would not leave the CUT-OUT state since the operator would not go through an explicit initialization process.

After the system 12 leaves the CUT-OUT state, it proceeds to the WAITING state where it monitors operator horn activation actuator 104 operations. With knowledge of the appropriate place to activate the horn device 106, based upon the grade crossing data 16 and the locomotive data 18, the onboard computer system 12 determines if the operator 108 has missed an opportunity. If the horn device 106 has not been sounded prior to a fixed distance to the crossing, the system 12 transitions to the WARNING state. That fixed distance is established by each railroad's requirements, but generally would be a short distance past the point where the horn device 106 would normally be activated. Also, based upon a recent change to the regulations regarding horn activation, the system 12 may determine if the horn device 106 had not been sounded with the upper and lower time limits of that regulation. If the system 12 has determined that the locomotive 100 will reach the crossing in a time less than the minimum sounding requirement (according to regulation, the system 12 will transition to the WARNING state. The amount of time allowed between the minimum warning time and the beginning of the WARNING state can be determined by each railroad's individual requirements. If the operator 108 sounds the horn device 106 as required, the system 12 will remain in the WAITING state, since there is no lack of vigilance by the operator 108.

In the WARNING state, the system 12 displays an icon to the operator 108 to remind him or her of the requirement to activate (or perhaps refrain from activating) the locomotive horn device 106. At the same time, the system 12 activates a single long blast again to alert the operator 108, and also to provide a backup to a potentially failed operator horn activation actuator 104. If the operator 108 regains vigilance at this point and activates his or her horn activation actuator 104, the system 12 will return to the WAITING state until the next grade crossing or horn device 106 activation is expected. If the operator 108 fails to regain vigilance, the system 12 will provide a second long horn blast as the locomotive 100 nears and traverses the grade crossing, since it can be assumed that the operator 108 is not capable of providing warnings to those on the ground.

In order to improve locomotive operator 108 vigilance, a method is provided and includes the steps of determining the grade crossing data 16, which includes grade crossing location, grade crossing identity, grade crossing regulation and grade crossing condition; determining horn activation requirement data for the grade crossing; determining locomotive data 18 including locomotive position on a track, locomotive position within a consist, locomotive speed and locomotive operation parameters; and providing an audio, visual and/or tactile indicator 22 to the operator 108 of the locomotive 100 based upon the grade crossing data 16, the locomotive data 18, horn activation requirement data and/or actuation condition of the horn activation actuator 104.

In this manner, an operator warning system 10 and method for improving operator 108 vigilance is provided. This system 10 and method not only provides for improved vigilance by an operator 108, but also tolerates system faults with less impact on safety than the prior art. In the event of a system 12 failure, an automatic horn activation system that has no interaction with the locomotive operator 108 would not provide any warning to individuals along the track. The present invention provides a system 10 and a method that improves upon this problem by providing primary control to the horn to the operator 108.

This invention has been described with reference to the preferred embodiments. Obvious modifications and alterations will occur to others upon reading and understanding the preceding detailed description. It is intended that the invention be construed as including all such modifications and alterations.

The invention claimed is:

1. An operator warning system for use in connection with a locomotive having a horn system with a horn activation actuator and a horn device configured to produce a noise, the operator warning system comprising:

an onboard computer system including a database including grade crossing data and locomotive data, the onboard computer system in communication with the horn system; and an onboard warning device configured to provide at least one of an audio, visual and tactile indicator to an operator of the locomotive based upon at least one of grade crossing data, locomotive data and actuation condition of the horn activation actuator.

2. The system of claim 1, wherein the grade crossing data includes data reflective of at least one of grade crossing location, grade crossing identity, grade crossing regulation, grade crossing condition and grade crossing horn activation requirement data.

3. The system of claim 1, wherein the locomotive data includes data reflective of at least one of locomotive position, locomotive speed, locomotive position in a consist, locomotive direction of travel and locomotive operation parameter.

4. The system of claim 1, wherein the onboard computer system is in communication with a central database including track data.

5. The system of claim 4, wherein the track data includes data reflective of at least one of grade crossing information, parallel track condition and switch information.

6. The system of claim 1, wherein the warning device is at least partially embodied as a visual display device configured to provide a visual indicator to the operator.

7. The system of claim 1, wherein the visual display device provides at least one of locomotive schematic data, track schematic data, track curvature data, grade data and grade crossing data.

8. The system of claim 7, wherein the grade crossing data includes horn activation requirement data indicative of whether horn device activation is required in connection with a specified grade crossing.

9. The system of claim 8, wherein a visual indication is provided to the operator indicating whether horn device activation is required in connection with a specified grade crossing.

10. The system of claim 9, wherein the visual indication is at least one of a shape, a color and a shade.

11. The system of claim 9, wherein the visual indication is modified when the activation requirement data changes.

12. The system of claim 1, wherein the grade crossing data includes horn activation requirement data, and wherein the warning device provides the indicator based upon at least one of horn activation requirement data and the actuation condition of the horn activation actuator.

13. The system of claim 1, wherein the onboard computer system sends a signal to the horn system to activate the horn device based upon at least one of the horn activation requirement data and the actuation condition of the horn activation actuator.

14. The system of claim 13, wherein the onboard computer system terminates the signal based upon the actuation condition of the horn activation actuator.

15. The system of claim 1, wherein the onboard computer system sends a signal to the horn system to activate the horn device during at least a portion of the time that the locomotive traverses a grade crossing.

16. The system of claim 1, further comprising a navigation system in communication with the onboard computer system and configured to provide locomotive location data to the onboard computer system.

17. The system of claim 16, wherein the navigation system comprises a speed sensing device and a global positioning system.

18. The system of claim 17, wherein the speed sensing device is an axle-mounted speed sensor.

19. The system of claim 17, wherein the global positioning system includes a global positioning receiver that provides periodic locomotive position data to the database on the onboard computer system.

20. The system of claim 16, wherein the navigation system comprises at least one of a transponder circuit, an inertial navigation system, a magnetic compass and computer vision.

21. The system of claim 1, further comprising an interface circuit in communication with the horn system and configured to determine whether the horn device has been activated by a signal initiated by the horn activation actuator or the onboard computer system.

22. The system of claim 1, wherein the indicator is at least one of an alarm, a light, a visual warning on a visual display and vibration of an operator's seat.

23. A method of improving locomotive operator vigilance for use in connection with a locomotive having a horn system with a horn activation actuator and a horn device configured to produce a noise, the method comprising the steps of:

determining grade crossing data including at least one of grade crossing location, grade crossing identity, grade crossing regulation and grade crossing condition;

determining horn activation requirement data for the grade crossing;

determining locomotive data including at least one of locomotive position on a track, locomotive position within a consist, locomotive speed, locomotive direction of travel and locomotive operation parameter; and providing at least one of an onboard audio, onboard visual and onboard tactile indicator to an operator of the locomotive based upon at least one of grade crossing data, locomotive data, horn activation requirement data and actuation condition of the horn activation actuator.

24. The method of claim 23, further comprising the step of communicating data between an onboard computer system and a central database including track data.

25. The method claim 24, wherein the track data includes data reflective of at least one of grade crossing information, parallel track condition and switch information.

26. The method of claim 23, further comprising the step of activating a warning device.

27. The method of claim 26, wherein the warning device is a visual display device, the method further comprising the step of displaying a visual indicator to the operator.

28. The method of claim 23, further comprising the step of providing a visual indicator to the operator indicating whether horn device activation is required in connection with a specified grade crossing.

29. The method of claim 28, wherein the visual indicator is at least one of a shape, a color and a shade.

30. The method of claim 28, wherein the visual indicator is modified when activation requirement data changes.

31. The method of claim 23, further comprising the step of providing the indicator based upon at least one of horn activation requirement data and the actuation condition of the horn activation actuator.

32. The method of claim 23, wherein the horn device is automatically activated based upon at least one of the horn activation requirement data and the actuation condition of the horn activation actuator.

33. The method of claim 32, further comprising the step of terminating the activation of the horn device based upon the actuation condition of the horn activation actuator.

34. The method of claim 23, further comprising the step of activating the horn device during at least a portion of the time that the locomotive traverses a grade crossing.

35. The method of claim 23, further comprising the step of monitoring actuation condition of the horn activation actuator.

36. The method of claim 23, further comprising the step of periodically updating locomotive position data.

37. The method of claim 23, further comprising the step of determining whether the horn device has been activated by a signal initiated by the horn activation actuator or automatically by an onboard computer system.

* * * * *

UNITED STATES PATENT AND TRADEMARK OFFICE

CERTIFICATE OF CORRECTION

PATENT NO. : 7,398,140 B2
APPLICATION NO. : 10/946396
DATED : July 8, 2008
INVENTOR(S) : Kernwein et al.

It is certified that error appears in the above-identified patent and that said Letters Patent is hereby corrected as shown below:

On the Title Page, Item (75) Inventors, line 2, "Frank Wilson" should read
-- M. Frank Wilson --

Signed and Sealed this

Sixteenth Day of December, 2008

JON W. DUDAS
*Director of the United States Patent and Trademark Office*